Dec. 22, 1959
W. N. KEMNITZ
2,918,314
PIPE COUPLING HAVING A PORTION OF THE OUTER
RESILIENT TUBE IN AXIAL TENSION
Filed July 29, 1955
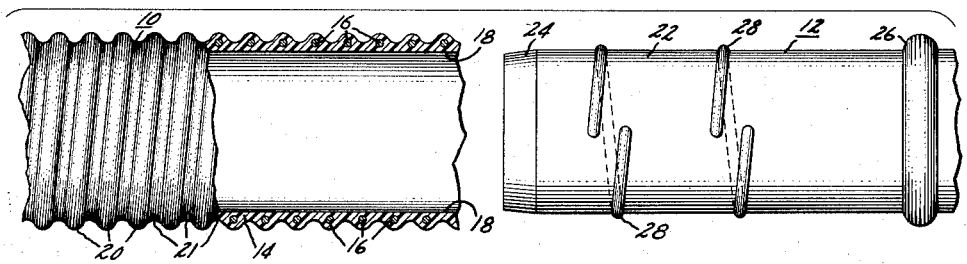
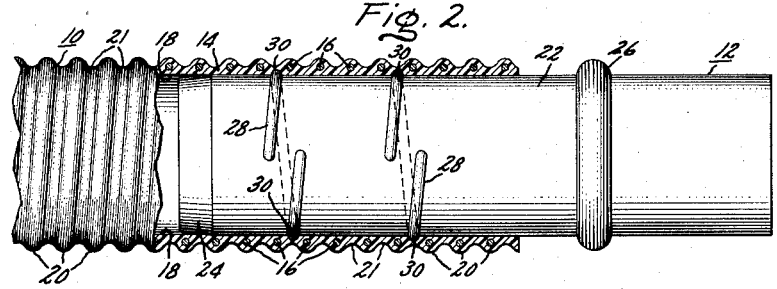
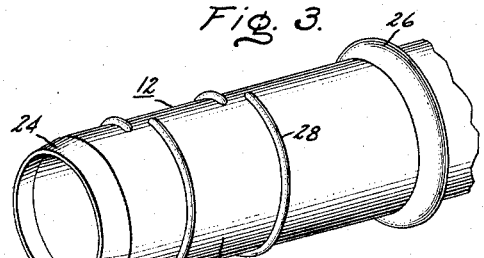
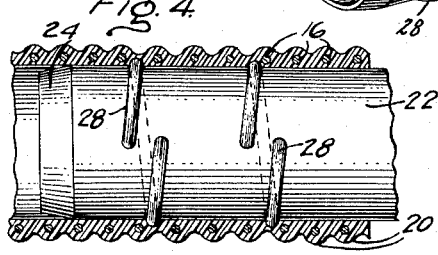
Inventor:
Warren N. Kemnitz,
by Armand Cifelli
His Attorney.

United States Patent Office 2,918,314
Patented Dec. 22, 1959

2,918,314

PIPE COUPLING HAVING A PORTION OF THE OUTER RESILIENT TUBE IN AXIAL TENSION

Warren N. Kemnitz, Willoughby, Ohio, assignor to General Electric Company, a corporation of New York Application July 29, 1955, Serial No. 525,133

1 Claim. (Cl. 285—239)

This invention relates generally to tube connections and, specifically, to a connection between a rigid tube and a resilient tube.

The tube art is a highly competitive one and, therefore, it constantly strives to simplify tube constructions and methods, and thereby render them less costly to produce. It is necessary in most uses of connected tubes that the connection be fluid tight. Numerous approaches suggest themselves when the problem is limited to connecting tubes of the same or similar material, for example, when connecting two pieces of metal tube numerous fastening or bonding techniques become self-evident. The same applies where both tubes are of resilient materials. When, however, the conection is to be made between tubes of dissimilar materials, such as a rigid tube and a resilient tube, difficulties peculiar to this relationship must be resolved. These difficulties are intensified when, as in some applications of use, the tubes must be readily detachable after they are connected. Finally, solution of the entire problem is colored by the overriding effect of the competitive forces in the art which dictate that any solution be accomplished in the most economical manner.

It is an object of this invention to provide a simple, effective, detachable connection for tubes, particularly of dissimilar materials, which is inexpensive to produce and readily connected and disconnected.

The object of this invention is accomplished in one form by providing a rigid tube which is provided with threaded means in the form of a plurality of disconnected raised threads, and a resilient tube having relatively rigid means which cooperates with said threaded means to effect the connection, and connecting the tubes in a unique manner.

Other objects and further details of that which I believe to be novel and my invention will be clear from the following description and claim taken with the accompanying drawing wherein:

Figure 1 is a fragmentary elevation view, with portions cut away and shown in section, of the two tubes which constitute the improved connection, prior to being connected.

Figure 2 is a view similar to Figure 1 showing the two tubes after the connection has been made.

Figure 3 is a perspective view of one of the tubes.

Fig. 4 is a view similar to Fig. 2 but showing the two tubes after they have been connected by the preferred method of connection.

Referring to Figure 1, reference numeral 10 designates a portion of a resilient tube, and reference numeral 12 designates a portion of a rigid tube. Resilient tube 10 generally comprises a cylindrical sleeve 14 having a spiral wire 16 embedded therein. Sleeve 14 is made of a resilient material such as natural or synthetic rubber, or a suitable plastic; in use, vinyl has been found to be well suited. Wire 16 may be made of metal or a hard plastic material, that is, hard in relation to the material of sleeve 14. The internal surface 18 of sleeve 14 is cylindrical and smooth prior to receiving the rigid tube 12 (see Fig. 1).

The outer surface of sleeve 14 is ridged, having a spiralled rib 20 formed thereon and a spiralled groove 21 intertwined with the rib so as to space adjacent turns of the rib. The wire 16 is embedded partly in the portion of sleeve 14 contiguous with the rib 20 and partly in the rib. The rib 20 and the portion of the sleeve 14 radially adjacent the rib are as an aggregate less resilient than the portion of the sleeve formed between the rib (that which is radially adjacent the groove 21). The latter obtains because of the presence of the wire in and the relatively greater thickness of the less resilient portion of the sleeve. Therefore, it follows, that the rib spacing portion of the sleeve yields more readily than the ribbed portion.

Rigid tube 12 comprises a sleeve 22 made of a material which is more rigid than that of which the sleeve 14 is made, such as metal, rigid plastic or hard rubber. Sleeve 22 is generally cylindrical and has a slightly tapered leading portion 24 at one end and a raised cylindrical rib 26 formed near its other end. Rib 26 is optional and may be used for the purpose of connecting additional members to the tube 12. When the instant invention is incorporated in the flexible hose of a vacuum cleaner, the tube 12 may constitute a swivel tube which is rigidly connected to the resilient tube 10 at one of its ends and has another hose member, such as a curved wand, swivelled at its other end. If this be the case, the rib 26 may be used as a swivelling rib to which the other member may be swivelled. Intermediate its extremities, the sleeve 22 has a pair of raised threads 28 formed thereon. As is illustrated, see Figs. 1 and 3, threads 28 are separate and axially spaced. Each of the threads 28 constitute a single turn of a spiral.

The following relative dimensional relationships should be noted. The external diameter of sleeve 22 is substantially the same as the internal diameter of the sleeve 14, but is so related as to fit tightly and snugly therein when fully mounted. The tapered portion 24 of sleeve 22 increases in diameter from its forward, smallest diameter, which is less than the internal diameter of the sleeve 14, to the diameter of the cylindrical portion of the sleeve 22. The latter is for the purpose of facilitating the insertion of the sleeve 22 into the sleeve 14. The internal diameter of a cylinder described by rotating spiral wire 16 about its axis is less than the external diameter of a cylinder described by the threads 28 when the tube 12 is rotated about its axis, but greater than the diameter of the outer cylindrical surface of the sleeve 22.

To effect the connection, the tubes 10 and 12 are brought into juxtaposition and the tapered portion 24 of the tube 12 is inserted into the sleeve 14 of the tube 10. The tubes are then manipulated relative to each other until the tube 12 is fully seated within the tube 10, as is shown in Figure 2. There are several alternative ways of accomplishing the completed connection. First, the connection may be effected simply by forcing the tubes axially toward each other. If this is done, portions of the tube 10 will be distorted to permit passage of the threads 28 through the tube 10 during the period when the tubes are being axially forced together prior to reaching the position shown in Figure 2. Alternatively, the connection may be effected by twisting the tubes relative to each other while applying axial force, thus simulating the manner of connecting two conventional threaded members. Lastly, the connection is preferably effected by twisting the tube 12 within the tube 10 until one of the threads 28 (as viewed in Fig. 1, the left-hand one) is wholly within the tube 10, then stretching the portion of the tube 10 through which the thread has already passed, so as to increase the distance between turns of the wire 16, and then twisting the second thread 28 into the tube 10. When the tubes are connected in the last mentioned manner, it will be recognized that the portion of tube 10 which is disposed between the threads 28 after the tubes are fully connected will be in tension because the wire 16 has been stressed during connection, and therefore, there are fewer turns in said portion of tube 10 after connection of the tubes (three turns, as shown in Fig. 4) than there were before connection of the tubes (four turns, as shown in Fig. 2); stated differently, the distance between the turns of wire 16 in said portion is less prior to connection of the tubes (see Fig. 2) than it is after connection of the tubes (see Fig. 4). This has the effect of causing this portion of sleeve 14 to tend to contract, thereby causing the axially outermost turn of the wire 16 adjacent to each of the threads 28 to be urged toward each other and to press against their adjacent thread, thereby firmly locking the tube 10 onto the tube 12. After the tubes are connected in this manner, they are in the physical condition shown in Fig. 4, wherein it will be noted that the distance between the turns of wire that are located between the threads 28 is greater than the distance between these turns 10 when the parts are disconnected (compare Fig. 4 with Fig. 1), and that the turns of wire that are adjacent to the threads 28 on the latter's axially outermost sides are urged toward the threads, and therefore, are closer to them than they are when the tubes are disconnected (compare Fig. 4 with Fig. 1).

Figure 2 shows the tubes in fully connected position when they are connected by either of the first two ways set forth above. It will be observed therein that each of the threads 28 is disposed between a pair of turns of the wire 16, and that the portion of sleeve 14 between each pair of turns adjacent a thread has been distorted so as to form thread-like grooves 30 in the sleeve 14 to accommodate the threads. Grooves 30 are temporary, being formed only where the threads 28 are disposed.

Separation of the tubes 10 and 12 shown in Fig. 2 is prevented by the engagement of the threads 28 and the portions of the sleeve 14 which form grooves 30, however the tubes are not locked in the sense that they are when in the Fig. 4 condition. The tubes will not be separated by axially separating forces during the course of normal use. If it is desired to intentionally separate the tubes, it is simply necessary to unscrew the tubes, as a pair of connected conventional threaded members would be unscrewed, and the threads 28 will form temporary grooves in the sleeve 14 as the tube 12 is withdrawn from the tube 10. Of course, the application of an abnormal amount of axially separating force will cause the tubes to separate, and in the case of the locked Fig. 4 condition, this may be necessary to effect disconnection.

When disassembled, the parts are substantially as they were prior to assembly, that is, no permanent changes in their form are made by their having been connected. When assembled, the connection is secure, being fluid tight, but temporary, effective, but quick. The improved connection does not require any coupling parts in addition to the two tubes to be connected. It will readily be appreciated that tube 10 may be formed to any desired length, and that when cut to length, it is not necessary to perform any further operations on it to render it ready for coupling to the tube 12. If it is desired to substitute a different tube, perhaps one of different length, for the tube 10 after it has been connected, it is simply necessary to separate the tubes and substitute the other tube for tube 10. Due to the fact that no substantial permanent effect on the tube 10 is caused by the connection, it is apparent that it may be reused or used for some other purpose.

The simplicity of construction and operational flexibility produced by the improved connection should be clear. The reduction in labor costs in assembling the connection should also be self-evident. Lastly, the effectiveness of the connection should be noted. This is highly important, for if the connection were not secure and fluid tight, all of its other virtues would go for naught in certain of its applications.

As will be evident from the foregoing description certain aspects of my invention are not limited to the particular details of construction of the examples illustrated, and I contemplate that various and other modifications and applications will occur to those skilled in the art. It is, therefore, my intention that the appended claim shall cover such modifications and applications as do not depart from the true spirit and scope of my invention.

What I claim as new and desire to secure by Letters Patent of the United States is:

A tube connection comprising: a resilient cylindrical tube and a cylindrical rigid tube; said resilient tube having a helically spiralled wire embedded therein, said wire being made of a material less resilient than that of the remainder of said resilient tube; said rigid tube having formed externally thereon a plurality of raised helical spiral threads of the same pitch as the helix of said helically spiralled wire, said threads being disconnected and axially spaced apart a distance greater than one pitch of said helix; the internal surface of said resilient tube being entirely cylindrical when said tubes are disconnected; the internal diameter of a cylinder described by rotating said wire about its axis being less than the external diameter of a cylinder described by rotating said threads about their axis; said tubes being dimensioned relative to each other in such a manner that said tubes are adapted to be connected to each other, and when so connected, said rigid tube is disposed within said resilient tube with each of said threads disposed between adjacent turns of said helically spiralled wire in spaced grooves formed temporarily in the internal surface of said resilient tube; and the portion of said resilient tube that lies between said grooves being placed in substantial axial tension during and after connection of said tubes, whereby the axial distance between the turns of wire that are located in said portion after connection is greater than it is when the tubes are disconnected, and the axially outermost turn of wire adjacent to each thread is thereby urged toward each other and its adjacent thread to thereby lock said resilient tube on said rigid tube.

References Cited in the file of this patent

UNITED STATES PATENTS

| | | |
|---|---|---|
| 1,203,546 | Parsons | Oct. 31, 1916 |
| 1,343,967 | Gilson | June 22, 1920 |
| 1,372,238 | Kreiter | Mar. 22, 1921 |
| 2,426,332 | Acres | Aug. 26, 1947 |
| 2,446,599 | Knaggs | Aug. 10, 1948 |
| 2,475,322 | Horton | July 5, 1949 |
| 2,763,499 | Swann | Sept. 18, 1956 |

FOREIGN PATENTS

| | | |
|---|---|---|
| 7,165 | Germany | Apr. 16, 1879 |
| 570,815 | Great Britain | July 24, 1945 |